United States Patent
Koike et al.

(10) Patent No.: US 7,080,711 B2
(45) Date of Patent: Jul. 25, 2006

(54) MOTOR-DRIVEN POWER STEERING APPARATUS

(75) Inventors: Yohei Koike, Tochigi (JP); Takahiro Kasuga, Tochigi (JP)

(73) Assignee: Showa Corporation, Saitama (JP)

( * ) Notice: Subject to any disclaimer, the term of this patent is extended or adjusted under 35 U.S.C. 154(b) by 9 days.

(21) Appl. No.: 11/012,412

(22) Filed: Dec. 15, 2004

(65) Prior Publication Data

US 2005/0280389 A1 Dec. 22, 2005

(30) Foreign Application Priority Data

Jun. 18, 2004 (JP) .............................. 2004-181738

(51) Int. Cl.
*B62D 5/00* (2006.01)
(52) U.S. Cl. ..................... 180/404; 180/446; 701/41
(58) Field of Classification Search ................ 180/404, 180/443, 446; 701/41–44
See application file for complete search history.

(56) References Cited

U.S. PATENT DOCUMENTS

| | | | | |
|---|---|---|---|---|
| 5,257,828 | A * | 11/1993 | Miller et al. ................ | 180/446 |
| 6,220,385 | B1 * | 4/2001 | Bohner et al. .............. | 180/404 |
| 6,779,626 | B1 * | 8/2004 | Matsuoka et al. .......... | 180/404 |
| 6,874,595 | B1 * | 4/2005 | Mukai et al. ............... | 180/446 |
| 2003/0188914 | A1 * | 10/2003 | Norman et al. ............. | 180/404 |
| 2003/0204294 | A1 * | 10/2003 | Gluch ......................... | 701/41 |
| 2005/0283291 | A1 * | 12/2005 | Whang ........................ | 701/41 |

OTHER PUBLICATIONS

Japanese Utility Model Publication No. HEI 8-8943.

* cited by examiner

*Primary Examiner*—Lesley D. Morris
*Assistant Examiner*—Matthew Luby
(74) *Attorney, Agent, or Firm*—Orum & Roth LLC

(57) ABSTRACT

In a rack and pinion type motor-driven power steering apparatus, the motor-driven power steering apparatus is provided with a rack position detecting means for detecting a position of the rack, a rack speed arithmetically operating means for calculating a moving speed (s) of the rack, a memory means for storing a relation between a predetermined rack speed (s) near a stroke end of the rack and a motor damping control start rack position in which a distance from the stroke end is farther in accordance with the rack speed (s) as a relation curve (C) of a coordinate map A collating means is provided for collating with the relation curve (C) between the rack speed (s) stored in the memory means and the motor damping control start rack position so as to determine whether or not a point coordinate (s, p) of the combination between the rack speed (s) calculated by the rack speed arithmetically operating means and the rack position (p) detected by the rack position detecting means gets over the relation curve (C). A motor drive control means is provided for controlling the motor in a damping state on the basis of a predetermined motor assist decreasing rate (As) where the collating means determines that the point coordinate (s, p) of the combination gets over the relation curve (C).

8 Claims, 6 Drawing Sheets

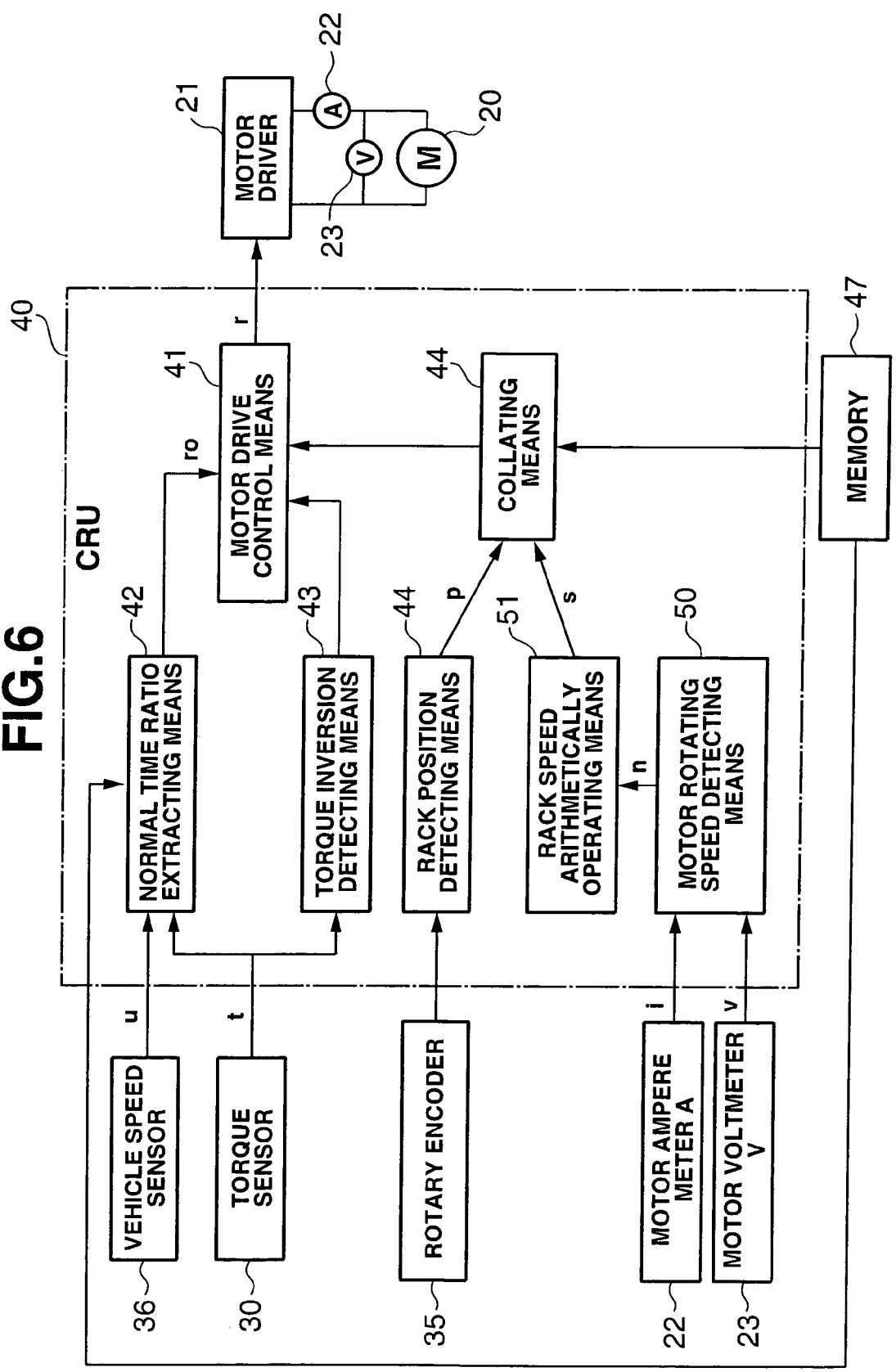

MOTOR-DRIVEN POWER STEERING APPARATUS

BACKGROUND OF THE INVENTION

1. Field of the Invention

The present invention relates to a rack and pinion type motor-driven power steering apparatus.

2. Description of the Related Art

In a rack and pinion type motor-driven power steering apparatus which assists steering operation by transmitting drive force of a motor to a steered wheel from a pinion shaft via a laterally moving rack, the laterally moving rack which passes through a gear box in which a rack and pinion mechanism is received, is brought into contact with a gear box side in a stopper portion of the rack at a stroke end in order to stop.

If the steering wheel is turned sharply, the stopper portion of the rack comes into banging contact with the gear box side at the stroke end. This results in problems such as the generation of an uncomfortable noise and damage to the gear box is damaged due to an impact load, and excessive motor drive current flow.

Accordingly, there has been proposed an example in which the motor drive current is reduced little by little when the rack reaches the position near the stroke end (refer to Japanese Utility Model Publication No. 8-8943 (patent document 1)). In the patent document 1, a rack end proximity sensor is provided which actuates a time constant circuit during a detecting time when the rack moves close to the stroke end. A current decreasing control circuit damps the motor drive current little by little so as to thereafter control and keep the motor drive current at a comparatively low level current value.

However, in the patent document 1, since the motor drive current is always damped at a fixed damping factor set by a time constant circuit 28 without reference to moving speed of the rack when the rack moves close to the stroke end, if the damping factor is set comparatively large so as not to cause trouble when the steering wheel is sharply turned and the moving speed of the rack is fast, the motor drive current is also damped at the same damping factor near the stroke end so as to be kept at a low level current value, even when the steering wheel is gently turned and the moving speed of the rack is slow. Accordingly, the time for steering in a heavy steering state has to be elongated, and the steering characteristic is deteriorated.

SUMMARY OF THE INVENTION

The present invention addresses and solves the aforementioned problems. An object of the present invention is to provide a motor-driven power steering apparatus which can absorb an impact at a stroke end while always keeping the steering characteristics good the entire turning range of a steering wheel.

The present invention relates to a rack and pinion type motor-driven power steering apparatus which assists steering operation by transmitting drive force of a motor to a steered wheel from a pinion shaft via a laterally moving rack. The apparatus comprises a rack position detecting means for detecting a position of the rack; a rack speed arithmetically operating means for calculating rack speed corresponding to moving speed of the rack; and a memory means for storing a relation between a predetermined rack speed near a stroke end of the rack and a motor damping control start rack position in which a distance from the stroke end is farther in accordance with the rack speed as a relation curve of a coordinate. A collating means collates with the relation curve between the rack speed stored in the memory means and the motor damping control start rack position so as to discriminate whether or not a combination position coordinate between the rack speed calculated by the rack speed arithmetically operating means and the rack position detected by the rack position detecting means gets over the relation curve. A motor drive control means controls the motor in a damping state on the basis of a predetermined motor assist decreasing rate, such that the collating means discriminates that the combination position coordinate gets over the relation curve.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIG. 6 is a schematic block diagram of a motor control system in accordance with a further embodiment.

DESCRIPTION OF THE PREFERRED EMBODIMENTS

A description will be given of an embodiment in accordance with the present invention with reference to FIGS. 1 to 5.

Figure 1:
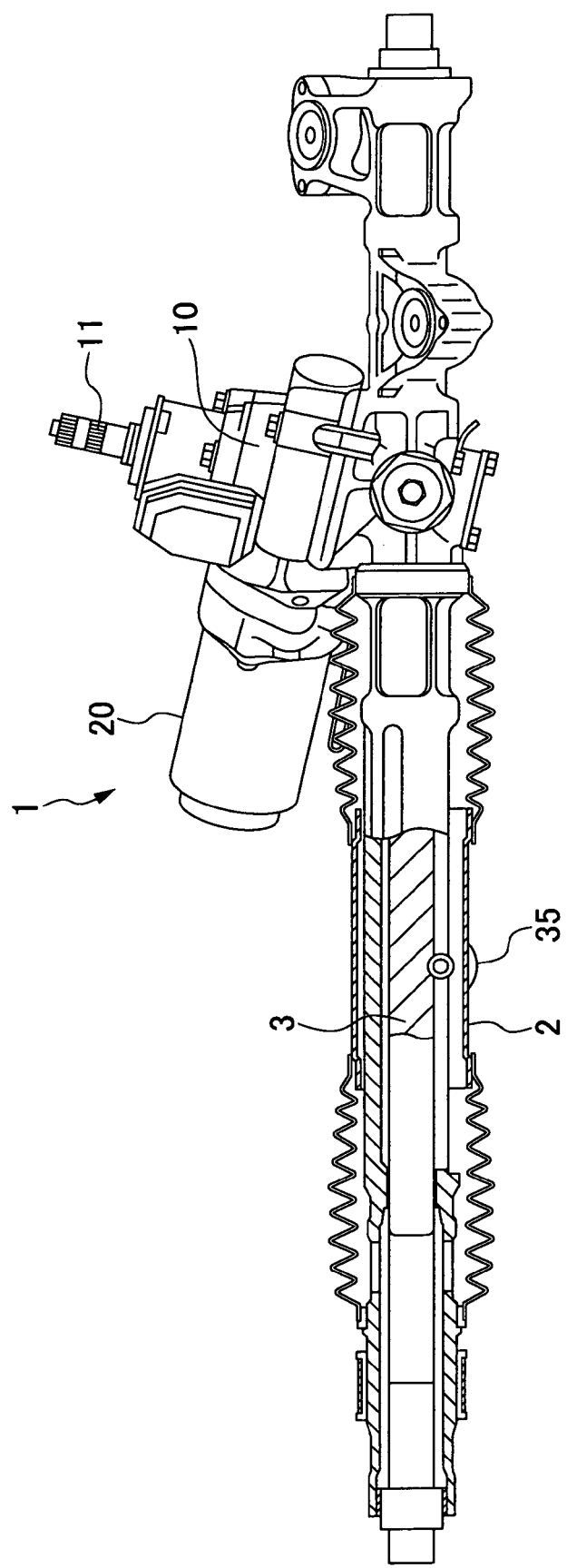
FIG. 1 is a schematic back elevational view of an entire of a motor-driven power steering apparatus in accordance with an embodiment of the present invention.

FIG. 1 shows a schematic back elevational view of an entire motor-driven power steering apparatus 1 in accordance with one embodiment.

The motor-driven power steering apparatus 1 is structured such that a rack shaft 3 is received in an approximately cylindrical rack housing 2 oriented to a lateral direction of a vehicle (coinciding with a lateral direction in FIG. 1) so as to be slidable in a lateral axial direction.

A tie rod is connected to each of both end portions of the rack shaft 3 protruding from both end openings of the rack housing 2 via a joint. The tie rod is moved on the basis of movement of the rack shaft 3, and a steered wheel of the vehicle is steered via a steering mechanism.

A steering gear box 10 is provided in a right end portion of the rack housing 2.

Figure 2:
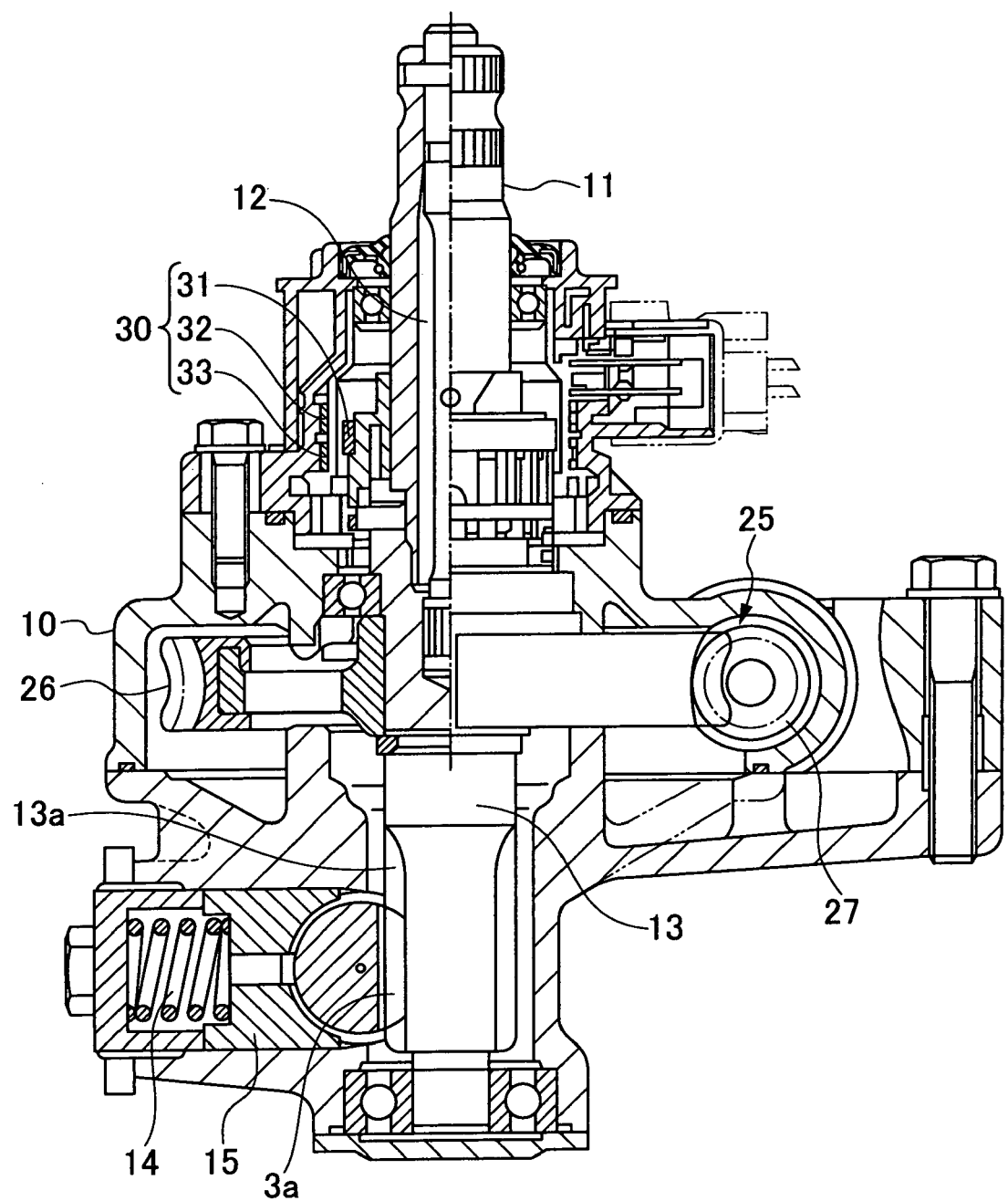
FIG. 2 is a cross sectional view of an inner side of a gear box.

An input shaft 11 connected to a steering shaft to which a steering wheel (not shown) is integrally attached via a joint is rotatably pivoted with respect to the steering gear box 10 via a bearing. The input shaft 11 is connected to a steering pinion shaft 13 so as to be relatively twisted via a torsion bar 12 within the steering gear box 10, as shown in FIG. 2.

A helical gear 13a of the steering pinion shaft 13 is engaged with a rack gear 3a of the rack shaft 3.

Accordingly, a steering force transmitted to the input shaft 11 on the basis of a rotating operation of the steering wheel rotates the steering pinion shaft 13 via the torsion bar 12 so as to slide the rack shaft 3 in a lateral axial direction, on the basis of the engagement between the helical gear 13a of the steering pinion 13 and the rack gear 3a.

The rack shaft 3 is pressed by a rack guide 15 energized by a rack guide spring 14 from a backside.

A rotary encoder 35 for detecting a moving position of the rack shaft 3 sliding in the laterally axial direction in the inner portion is provided at an approximately center position of the rack housing 2.

A motor 20 is attached to an upper portion of the steering gear box 10. A worm speed reducing mechanism 25 transmitting a drive force of the motor 20 to the steering pinion shaft 13 in a speed reducing state is disposed within the steering gear box 10.

The worm speed reducing mechanism 25 is structured such that a worm 27 coaxially connected to the drive shaft of the motor 20 is engaged with a worm wheel 26 fitted to an upper portion of the steering pinion shaft 13.

The steering operation is assisted by applying the drive force of the motor 20 to the steering pinion shaft 13 via the worm speed reducing mechanism 25.

A torque sensor 30 is provided in a further upper side of the worm speed reducing mechanism 25.

Steering torque T is detected by converting torsion of the torsion bar 12 into movement in an axial direction of a core 31, and changing the movement of the core 31 to an inductance change of coils 32 and 33.

In one embodiment, a torque sensor optically detecting the torsion of the torsion bar 12 may be employed.

Figure 3:
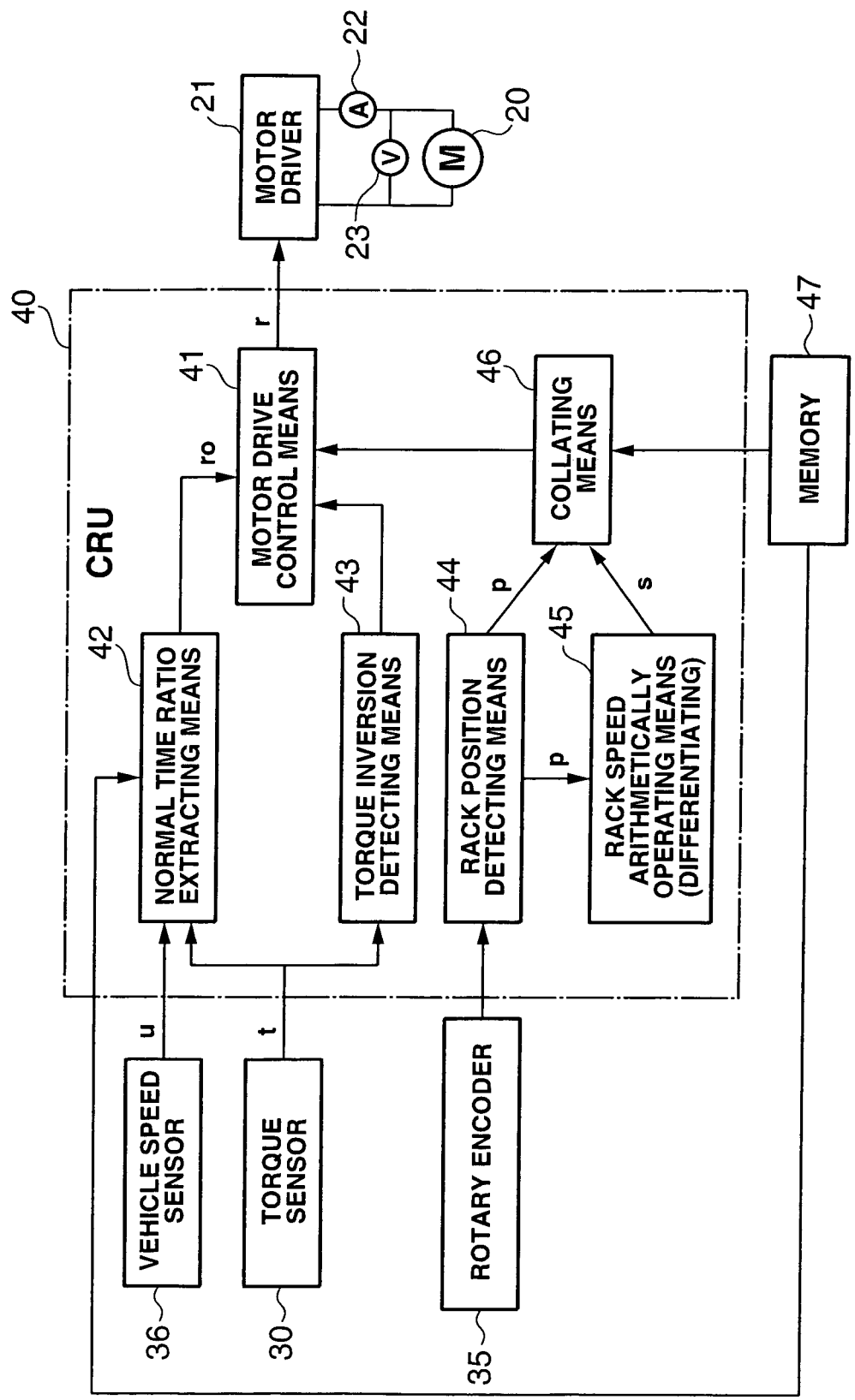
FIG. 3 is a schematic block diagram of a motor control system.

The motor 20 which is controlled on the basis of the steering torque so as to assist the steering operation is driven and controlled by a computer, as set out in a schematic block diagram of the control system shown in FIG. 3.

A CPU 40 of the computer has functions of a motor drive control means 41, a normal time ratio extracting means 42, a torque inversion detecting means 43, a rack position detecting means 44, a rack speed arithmetically operating means 45, and a collating means 46. A detection signal is input thereto from the torque sensor 30, the rotary encoder 35 and a vehicle speed sensor 36, and a control signal is output to a motor driver 21 from the motor drive control means 41, whereby the motor 20 is driven by the motor driver 21.

In this case, a motor ampere meter 22 measures current supplied to the motor 20, and a motor voltmeter 23 measures voltage between terminals of the motor 20.

The motor drive control means 41 executes a PWM (Pulse Width Modulation) control of driving and controlling the motor by changing a rate (a time ratio) according to the relationship r=Ton/T of a time Ton circulating the current at a fixed period T. The larger the time ratio r is, the larger the motor assist amount is.

The normal time ratio ro during normal running is previously determined in correspondence to the vehicle speed and the steering torque, and is stored in a memory 47. The normal time ratio extracting means 42 extracts the normal time ratio ro from the memory 47 on the basis of a vehicle speed u detected by the vehicle speed sensor 36, and a steering torque t detected by the torque sensor 30.

Further, the torque inversion detecting means 43 detects an inversion of the torque on the basis of the turning-back operation of the steering from the detected steering torque t of the torque sensor 30.

The normal time ratio ro extracted by the normal time ratio extracting means 42 and the torque inversion signal detected by the torque inversion detecting means 43 are output to the motor drive control means 41.

The rack position detecting means 44 is structured so as to detect a rack moving amount p from a neutral position of the laterally moving rack shaft 3 as a rack position, by count processing the detected signal of the rotary encoder 35. The detected rack moving amount (the rack position) p is output to the collating means 46 and is also output to the rack speed arithmetically operating means 45.

The rack speed arithmetically operating means 45 calculates a rack speed s by differentiating the input rack moving amount p and output to the collating means 46.

The memory 47 stores the normal time ratio (the motor assist amount) ro on the basis of the steering torque t and the vehicle speed u, and stores the optimum rack moving amount (the rack position) p starting the control for reducing the motor assist amount when the rack shaft 3 moves close to the stroke end, in relation to the rack speed s.

Figure 4:
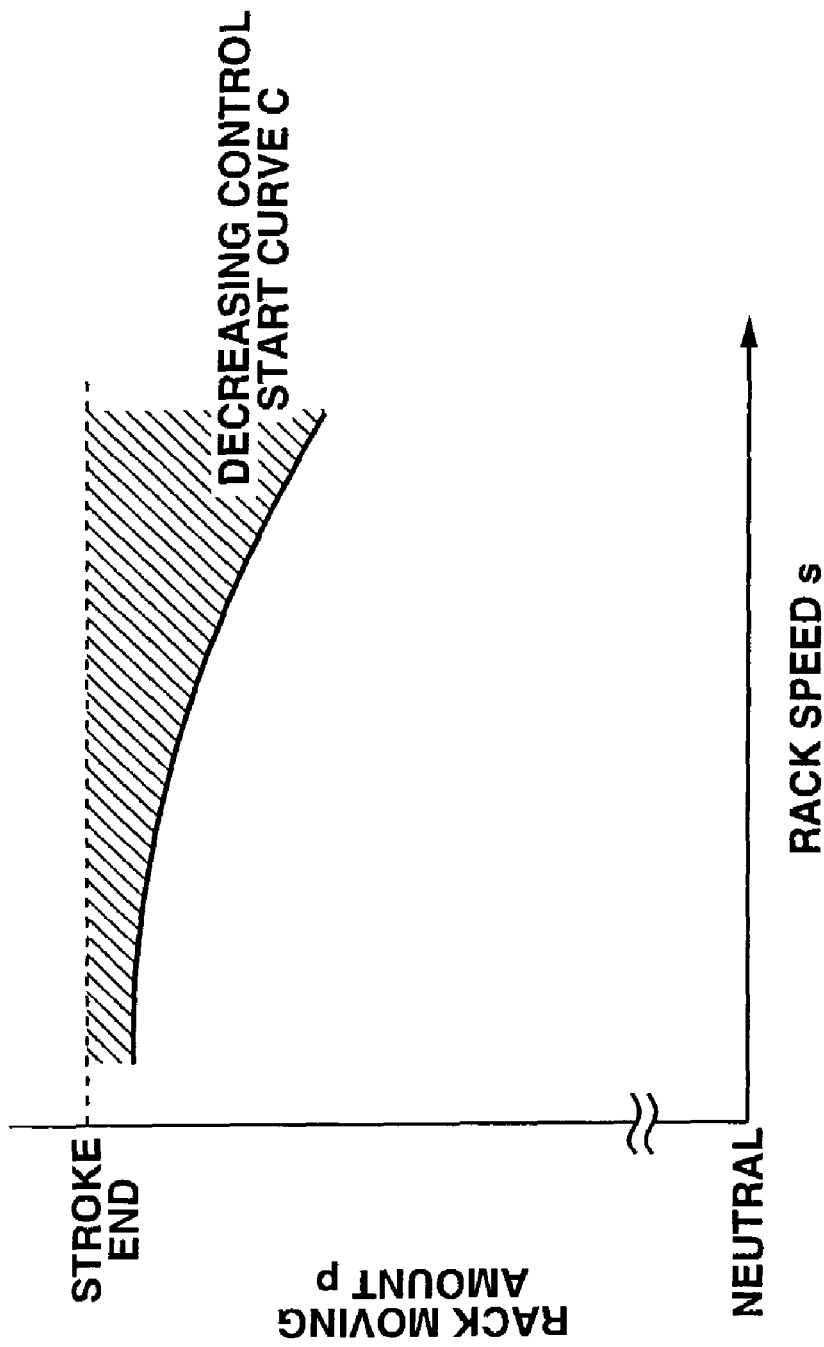
FIG. 4 is a coordinate map showing a relation between an optimum rack speed s and a rack moving amount (a rack position) p for starting a control reducing motor assist amount stored in a memory.
Figure 5:
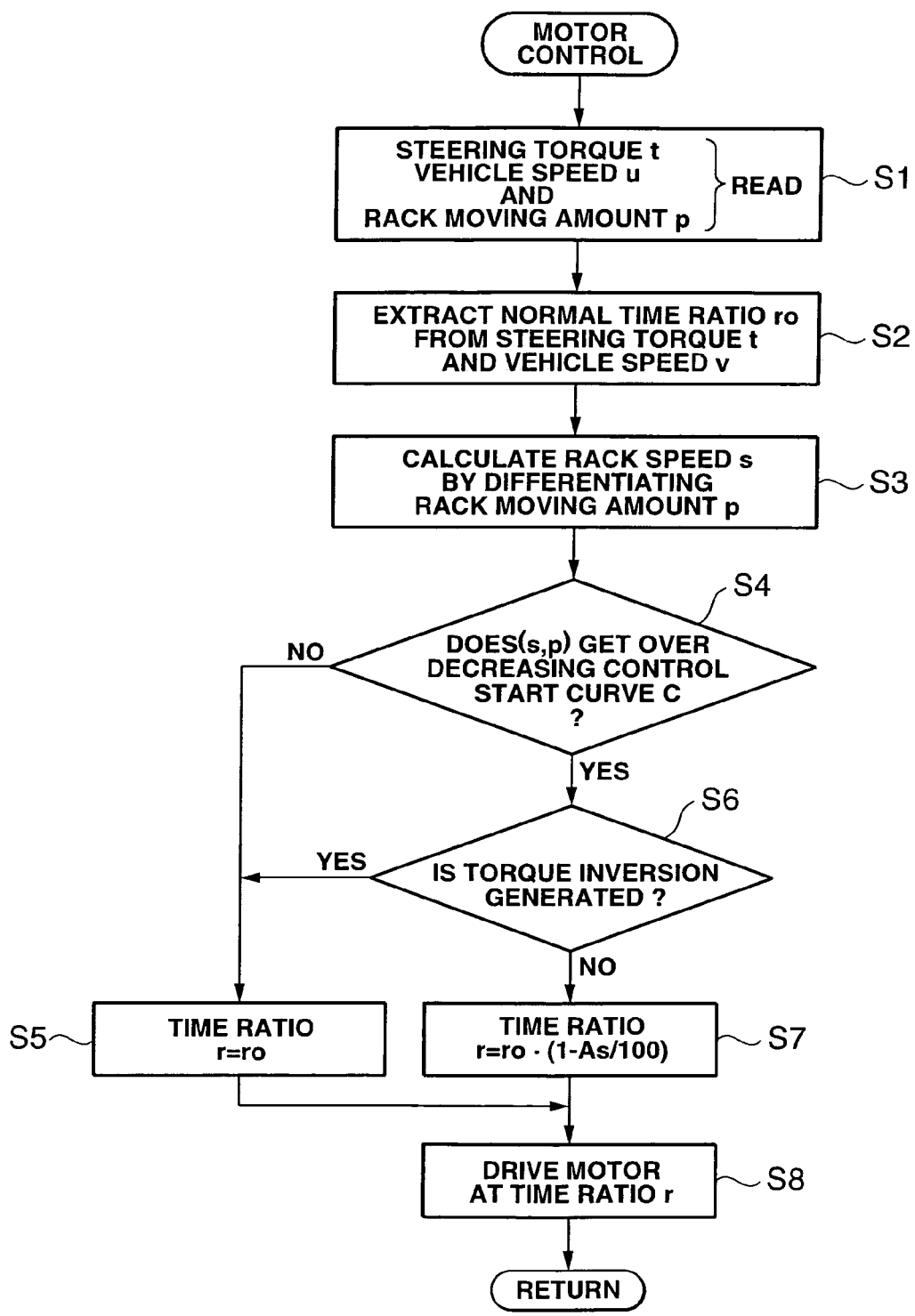
FIG. 5 is a flow chart showing the steps of motor control.

A relation between the optimum rack speed s starting the control for reducing the motor assist amount and the rack moving amount (the rack position) p is shown as a decreasing control start curve C in rectangular coordinates in FIG. 4.

In this coordinate system, the decreasing control start curve C exists near the stroke end. The larger the rack speed s is, the farther the rack moving amount p is from the stroke end.

The collating means 46 is a means for collating a combination position coordinate of the rack moving amount p detected by the rack position detecting means 44 and the rack speed s calculated by the rack speed arithmetically operating means 45 with the decreasing control start curve C stored in the memory 47, so as to discriminate whether or not they match to each other.

The discriminated result of the collating means 46 is output to the motor drive control means 41.

As mentioned above, the normal time ratio ro, the discriminated result when starting the control and the torque inversion signal input to the motor drive control means 41 to be processed, executes drive control of the motor 20.

A description will be given of the steps of the motor control by the control system of the CPU 40 mentioned above with reference to a flow chart in FIG. 5.

The first step involves reading the steering torque t detected by the torque sensor 30, the vehicle speed u detected by the vehicle speed sensor 36 and the rack moving amount p detected by the rack position detecting means 44 (step 1).

Then, the normal time ratio extracting means 42 extracts the normal time ratio ro on the basis of the steering torque t and the vehicle speed u by searching a corresponding relation stored in the memory 47 (step 2).

Next, the rack speed arithmetically operating means 45 calculates the rack speed s by differentiating the rack movement amount p (step 3).

The next step 4 collates a point coordinate (s, p) of the combination of the detected rack movement amount p and the calculated rack speed s with the decreasing control start curve C stored in the memory 47 by the collating means 46 so as to discriminate whether or not the point coordinate gets over the curve C (refer to FIG. 4).

When the point coordinate (s, p) of the combination of the detected rack moving amount p and the calculated rack speed s does not get over the decreasing control start curve C, step 5 occurs so as to set the time ratio r to the normal time ratio ro, and progresses to step 8, where the motor 20 is driven on the basis of the normal time ratio ro.

When the point coordinate (s, p) reaches the decreasing control start curve C in step 4, step 6 occurs so as to discriminate whether or not the discriminated result of the torque inverse is output by the torque inverse detecting means 43. When it is discriminated and/or determined that the torque inverse is not generated, step 7 occurs so as to employ an expression ro·(1−As/100) obtained by applying a predetermined motor assist decreasing rate As (%) to the normal time ratio ro as the time ratio r. The next progression is step 8, where the motor 20 is driven in a damped state on the basis of the decreased time ratio r (=ro·(1−As/100)).

Accordingly, the motor 20 is controlled in a damped state at the position where the larger the rack speed s is, the farther the rack moving amount p is from the stroke end. That is, at an earlier timing than a time when the rack shaft 3 moves close to the stroke end. Accordingly, it is possible to absorb an impact at the stroke end while always keeping the steering characteristics good throughout the full turning range of the steering wheel.

In the case that the point coordinate (s, p) reaches the decreasing control start curve C, when it is discriminated and/or determined in step 6 that the torque inversion is generated, step 5 occurs, which sets the time ratio r to the normal time ratio ro, and the motor 20 is driven on the basis of the normal time ratio ro (step 8).

When the point coordinate (s, p) reaches the decreasing control start curve C, and the motor 20 enters into the damping drive at the time ratio r (=ro·(1−As/100)), or is going to enter into the damping drive, when the torque inverse is detected by the turning-back of the steering wheel, the time ratio r is set to the normal time ratio ro, and the motor 20 is driven in the reverse rotating manner without being controlled to be damped, so that no delay of response is generated.

Accordingly, in order to absorb the impact at the stroke end, the motor 20 is driven in a damping state at a time ratio r (=ro·(1−As/100)) decreased near the stroke end. However, since the motor 20 is reverse rotated when the torque inverse is detected, collision at the stroke end can be avoided. It is not necessary to drive the motor 20 in a damped state at this time, and the motor 20 is driven and controlled at the normal time ratio ro. Accordingly, it is possible to smoothly execute the turning-back operation of the steering near the stroke end.

In the embodiment mentioned above, the rack speed arithmetically operating means 45 calculates the rack speed s by differentiating the rack moving amount p detected by the rack position detecting means 44. An example for calculating the rack speed s in accordance with the other method is shown as a schematic block diagram of the control system in FIG. 6.

A motor rotating speed detecting means 50 is provided. The detected signals from the motor ampere meter 22 and the motor voltmeter 23 are input. The motor rotating speed detecting means 50 calculates a voltage applied to the motor 20 on the basis of a measured current value i and a motor resistance value, determines an induced voltage by subtracting the voltage from the measured voltage v between the motor terminals, and estimates a motor rotating speed n on the basis of the induced voltage value and an induced voltage constant.

In this case, in order to determine the motor rotating speed n, a rotation of a rotary drive shaft of the motor may be directly detected by using the rotary encoder.

The present rack speed arithmetically operating means 51 can calculate the rack speed s by multiplying the motor rotating speed n determined by the motor rotating speed-detecting means 50 by a predetermined change gear ratio from the motor to the rack and pinion.

The other function means are the same as those in the schematic block diagram of the control system shown in FIG. 3.

In the embodiment mentioned above, the PWM control is executed for driving the motor. However, even in the case of executing a drive control other than the PWM control, the present invention can be applied in accordance with a damping control of the electric power supply to the motor.

As mentioned above, in accordance with the present invention, there is provided the rack and pinion type motor-driven power steering apparatus assisting the steering operation by transmitting the drive force of the motor to the steered wheel from the pinion shaft via the laterally moving rack. The motor-driven power steering apparatus is provided with rack position detecting means for detecting the position of the rack, and rack speed arithmetically operating means for calculating the rack speed corresponding to the moving speed of the rack. Memory means is provided for storing the relation between the predetermined rack speed near the stroke end of the rack and the motor damping control start rack position in which the distance from the stroke end is farther in accordance with the rack speed as the relation curve of the coordinate. Collating means is provided for collating with the relation curve between the rack speed stored in the memory means and the motor damping control start rack position so as to discriminate whether or not the combination position coordinate between the rack speed calculated by the rack speed arithmetically operating means and the rack position detected by the rack position detecting means gets over the relation curve. Motor damping control means is provided for controlling the motor in a damped state on the basis of the predetermined motor assist decreasing rate where the collating means discriminates and/or determines that the combination position coordinate gets over the relation curve.

Accordingly, the relation between the rack speed and the motor damping control start rack position in which the distance from the stroke end is farther in accordance with the rack speed is previously determined. Memory means stores the relation curve. The motor is controlled in the damped state on the basis of the predetermined motor assist decreasing rate, during discrimination on the basis of the collation of the collating means as to whether the combination position coordinate between the rack speed and the rack position near the stroke end of the rack gets over the relation curve stored in the memory means. Therefore, the faster the rack speed is, the earlier the damping control is started. It is thereby possible to absorb the impact at the stroke end while always keeping the steering characteristic good throughout the full turning range of the steering wheel.

In accordance with the present invention, in the motor-driven power steering apparatus mentioned above, the structure may be made such that the rack speed arithmetically operating means calculates the rack speed by differentiating the rack moving position detected by the rack position detecting means.

Accordingly, the rack speed can be determined by differentiating the rack moving position detected by the rack position detecting means.

Further, in accordance with the present invention, in the motor-driven power steering apparatus mentioned above, the structure may be made such that the motor rotating speed detecting means for detecting the rotating speed of the motor is provided. The rack speed is calculated by multiplying the motor rotating speed detected by the motor rotating speed detecting means by the predetermined change gear ratio from the motor to the rack and pinion.

Accordingly, the rack speed can be determined by multiplying the motor rotating speed detected by the motor rotating speed-detecting means by the predetermined change gear ratio from the motor to the rack and pinion.

In accordance with the present invention, in any one of the motor-driven power steering apparatuses mentioned above, the structure may be made such that the torque inversion detecting means for detecting the inversion of the torque direction of the steering torque is provided. The motor drive control means executes the normal motor assist control at a time when the torque inversion detecting means detects the torque inversion when the collating means discriminates that the combination position coordinate gets over the relation curve.

Accordingly, when the combination position coordinate gets over the relation curve, damping control of the motor is started on the basis of the predetermined motor assist decreasing rate. However, when the torque inverse is detected in this state, the normal motor assist control is executed by discriminating and/or determining that the turning-back operation of the steering wheel is executed. The execution of the inversion drive takes place on the basis of the normal motor assist control while avoiding the drive reduction due to the damping control, and the avoidance of delay in response due to the turning-back operation is also possible.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A rack and pinion type motor-driven power steering apparatus for assisting a steering operation by transmitting a drive force of a motor to a steered wheel from a pinion shaft via a laterally moving rack, comprising:
   a rack position detecting means for detecting a position of the rack;
   a rack speed arithmetically operating means for calculating a rack speed corresponding to a moving speed of the rack;
   a memory means for storing a relation between a predetermined rack speed near a stroke end of the rack and a motor damping control start rack position in which a distance from the stroke end is farther in accordance with the rack speed with respect to a relation curve of a coordinate;
   a collating means for collating with the relation curve between the rack speed stored in the memory means and the motor damping control start rack position so as to discriminate whether or not a combination position coordinate between the rack speed calculated by the rack speed arithmetically operating means and the rack position detected by the rack position detecting means gets over the relation curve; and
   a motor drive control means for controlling the motor in a damping state on the basis of a predetermined motor assist decreasing rate where the collating means determines that the combination position coordinate gets over the relation curve.

2. A motor-driven power steering apparatus according to claim 1, wherein the rack speed arithmetically operating means calculates the rack speed by differentiating the rack moving position detected by the rack position detecting means.

3. A motor-driven power steering apparatus according to claim 1, further comprising a motor rotating speed detecting means for detecting the rotating speed of the motor,
   wherein the rack speed is calculated by multiplying the motor rotating speed detected by the motor rotating speed-detecting means by a predetermined change gear ratio from the motor to the rack and pinion.

4. A motor-driven power steering apparatus according to claim 1, further comprising a torque inversion detecting means for detecting inversion of a torque direction of the steering torque,
   wherein the motor drive control means executes a normal motor assist control when the torque inversion detecting means detects the torque inversion where the collating means determines that the combination position coordinate gets over the relation curve.

5. A motor-driven power steering apparatus according to claim 2, further comprising a torque inversion detecting means for detecting an inversion of a torque direction of the steering torque,
   wherein the motor drive control means executes a normal motor assist control when the torque inversion detecting means detects the torque inversion where the collating means determines that the combination position coordinate gets over the relation curve.

6. A motor-driven power steering apparatus according to claim 3, further comprising a torque inversion detecting means for detecting an inversion of a torque direction of the steering torque,
   wherein the motor drive control means executes a normal motor assist control when the torque inversion detecting means detects the torque inversion where the collating means determines that the combination position coordinate gets over the relation curve.

7. A motor-driven power steering apparatus according to claim 1, wherein the motor drive control means executes a Pulse Width Modulation control for driving and controlling the motor by changing a time ratio corresponding to a rate of time for circulating current at a fixed period.

8. A motor-driven power steering apparatus according to claim 7, further comprising a vehicle speed sensor for detecting vehicle speed and a torque sensor for detecting steering torque,
   wherein a time ratio which is previously determined in correspondence to the vehicle speed and the steering torque is stored in the memory means, and the motor-driven power steering apparatus is provided with a normal time ratio extracting means for extracting a normal time ratio from the memory means on the basis of the vehicle speed detected by the vehicle speed sensor and the steering torque detected by the torque sensor.

* * * * *